United States Patent [19]

Hasegawa et al.

[11] Patent Number: 5,685,417
[45] Date of Patent: Nov. 11, 1997

[54] TEAR-RESISTANT CONVEYOR BELT

[75] Inventors: Arata Hasegawa, Kobe; Toshiaki Koga, Hyogo; Takahide Mizuno, Kobe; Hidesuke Takashima, Hyogo; Yasunori Matsuo, Kobe; Hiroshi Okawa, Akashi, all of Japan

[73] Assignee: Mitsuboshi Belting Ltd., Kobe, Japan

[21] Appl. No.: 561,593

[22] Filed: Nov. 21, 1995

[51] Int. Cl.$^6$ ................................ B65G 15/34
[52] U.S. Cl. ........................................ 198/847
[58] Field of Search ................... 198/846, 847, 198/843

[56] References Cited

U.S. PATENT DOCUMENTS

| | | |
|---|---|---|
| 3,200,180 | 8/1965 | Russ et al. . |
| 3,323,637 | 6/1967 | Jenkins ................................ 198/847 |
| 3,615,152 | 10/1971 | Bouzat et al. ..................... 198/847 |
| 3,620,897 | 11/1971 | Tanimoto et al. ............... 198/847 X |
| 3,987,684 | 10/1976 | Fisher et al. . |
| 4,216,856 | 8/1980 | Moring et al. .................. 198/847 |
| 4,394,340 | 7/1983 | Tarumi et al. . |
| 5,219,505 | 6/1993 | Kaiser . |
| 5,421,450 | 6/1995 | Kitagawa et al. ............ 198/847 |

FOREIGN PATENT DOCUMENTS

| | | | |
|---|---|---|---|
| 533482 | 3/1993 | European Pat. Off. . | |
| 2129982 | 11/1972 | France ............................ 198/847 |
| 0271308 | 8/1989 | Germany ....................... 198/847 |
| 59-93342 | 5/1984 | Japan . | |
| 61-110519 | 5/1986 | Japan . | |
| 5-221548 | 8/1993 | Japan . | |

OTHER PUBLICATIONS

Abstract of Japanese Patent Laid–Open Publ. No. 221548/ Aug. 1993.

European Patent Office Abstracts–Publication Nos. J61084214, Apr. 1986 J59093342, May 1984 and J61110519, May 1986.

J59093342, May 1984 and J61110519, May 1986.

Japanese Patent Abstracts Publ. Nos.:JP59093342 May 1984, JP61110519 May 1986 & JP63017711 Jan. 1988.

*Primary Examiner*—D. Glenn Dayoan
*Attorney, Agent, or Firm*—Wood, Phillips, VanSanten, Clark & Mortimer

[57] ABSTRACT

A conveying belt having a belt body with oppositely facing inner and outer surfaces and a width between laterally spaced sides. The belt body has a first layer, with the first layer being an elastomer with a first plurality of discrete fibers therein having lengths substantially less than the width of the body. The lengths of the fibers in a second plurality of fibers in the first plurality of fibers are randomly oriented and reside substantially in a single plane. The invention is also directed to a method of making the conveying belt.

21 Claims, 3 Drawing Sheets

TEAR-RESISTANT CONVEYOR BELT

BACKGROUND OF THE INVENTION

1. Field of the Invention

This invention relates to flat conveying belts, such as those trained continuously around spaced shafts and, more particularly, to a conveying belt that is expandable in a lengthwise direction and has structure therein to resist tearing. The invention is also directed to a process for manufacturing the inventive belt.

2. Background Art

It is known to train flat belts around spaced shafts in a conveying system for discrete articles. Some of these systems have shafts that are fixed in relationship to each other i.e. wherein the spacing between the shafts cannot be adjusted. In these systems, it is known to use an expandable belt that is made from elastic material that allows lengthwise stretching of the belt to effect installation thereof.

A conveying belt made entirely from elastic material is generally prone to tearing in use. These belts may break relatively easily when transporting goods such as sheets of paper, or the like.

Generally, a conventional belt that is formed solely from an elastic material, even one of high and uniform quality, does not exhibit a satisfactory resistance to tearing. If a small crack appears, as at the edge of the belt, it tends to expand rapidly, which may cause premature failure of the belt.

In another recent development, as disclosed in Japanese Patent Laid-Open Publication No. 221548/1993, a flat conveying belt is employed with a rubber layer having short fibers disposed around the circumference of the belt to improve tear resistance along its circumference.

By incorporating short fibers around the circumference of the belt, expandability of the belt may be unsatisfactorily compromised.

Recently, elastic belts of this type have been reinforced by embedding therein a cylindrically shaped, highly expandable, knitted fabric.

Generally, while the knitted reinforcing fabric improves tear resistance, the reinforced belts have been found to lack uniformity and quality, which results in non-uniform expansion from one portion of the belt to the other. This may be attributable to the fact that the knitted fabric has a zig-zag pattern with a stitch density that is not uniform, either longitudinally or laterally of the belt. While the fabric does slow or stop crack propagation from the edge of the belt, the fabric has also been responsible for movement of the belt a) in a non-straight running pattern, b) away from a pulley carded on a shaft, or c) at a varying speed.

It is known to manufacture a belt by causing a liquid material to harden in a rotating cylindrical mold. The process employs an outer mold and an inner mold, with the inner mold being smaller and inserted within the larger outer mold. Commonly, this method produces a belt with bubbles captured within the belt.

SUMMARY OF THE INVENTION

In one form of the invention, a conveying belt is provided having a belt body with oppositely facing inner and outer surfaces and a width between laterally spaced sides. The belt body has a first layer, with the first layer being an elastomer with a first plurality of discrete fibers therein having lengths substantially less than the width of the body. The lengths of the fibers in a second plurality of fibers in the first plurality of fibers are randomly oriented and reside substantially in a single plane.

In one form, the lengths of fibers in a third plurality of fibers in the first plurality of fibers are angularly oriented with respect to a fourth plurality of fibers in the first plurality of fibers.

The fibers in the first plurality of fibers may reside in a plurality of spaced, parallel planes.

In one form, at least one of the inner and outer body surfaces is flat and the single plane is substantially parallel to the at least one of the inner and outer body surfaces.

The fibers in the first plurality of fibers may be fully surrounded by the elastomer.

The body may include at least a second layer that is an elastomer. A third layer can be provided, with the first layer residing between the second and third layers.

The fibers in the first plurality of fibers may be present in an amount of 1–20 parts by weight of fiber per 100 parts by weight of elastomer in the first layer.

The fibers in the first plurality of fibers may have a length of 0.05–5 mm.

The fibers in the first plurality of fibers may have a diameter of 10–30 microns.

In one form, the body has a second layer and a thickness between the inner and outer surfaces, which second layer may be formed without any fibers therein. The first layer has a thickness between the inner and outer surfaces. The first layer has a thickness from 10%–90% of the thickness of the body. The first layer may have a thickness from 20%–60% of the thickness of the body.

The fibers in the second plurality of fibers may be flocked fibers. These fibers may be made from one of nylon, polyester, aramid, cotton and glass.

The elastomer may be a thermosetting liquid rubber.

The body has a thickness between the inner and outer surfaces. In one form, the width of the body is at least eight times the thickness of the body.

In another form of the invention, a conveying belt is provided having a belt body with oppositely facing inner and outer surfaces and a width between laterally spaced sides. The belt body has a plurality of layers including a first layer. The first layer is an elastomer with a plurality of discrete fibers embedded therein and having lengths substantially less than the width of the body. A majority of the discrete fibers in the first layer are randomly oriented and reside substantially in a single plane.

The invention is also directed to a method of forming a conveying belt, including the steps of: providing a mold having a first part defining a first surface with a first diameter and a second part defining a second surface with a second diameter, with the first and second surfaces bounding an annular space extending around a first axis; directing a liquid matrix material with fibers therein into the annular space; rotating the mold around the first axis; solidifying the liquid matrix material to define an endless sleeve; and separating the endless sleeve from the mold.

In one form, the first and second surfaces each define a right circular cylinder.

The endless sleeve can be cut after it is removed from the mold. The endless sleeve has a width in an axial direction with the belt sleeve in the mold, with the step of cutting involving cutting the endless sleeve to a desired width.

The liquid matrix material may be directed into the annular space with the mold at a standstill. Alternatively, the mold can be moved at a first rotational velocity which is less than a second rotational velocity at which the mold is ultimately rotated during the sleeve forming process.

The liquid matrix material may be a prepolymer. The material is rotated so as to cross link the matrix material.

The rotation of the mold may be carried out to cause the fibers to be tangent to a cylinder that is centered on the first axis.

In one form, the mold has a top and bottom spaced axially with respect to the first axis and the liquid is directed into the bottom of the annular space.

The step of directing the liquid matrix material into the annular space may be performed with the mold rotating at a speed to exert a centrifugal force of no more than 1000N on the liquid matrix material.

A second liquid material can be introduced into the annular space before directing the liquid matrix material therein. In one form, there are no fibers in the second liquid material. A curing agent can be used with the second liquid material.

The second liquid material, upon being rotated, may form a semi-crosslinked elastomer layer.

A high tensile strength, low elongation cord may be spirally wrapped on one of the first and second mold surfaces. This wrapping may be done before introduction of the liquid matrix material into the annular space.

By orienting a majority of the short fibers in the elastomer in the first layer randomly in a plane, i.e. in two axial directions as opposed to three axial directions, the resulting conveying belt exhibits good resistance to tearing, even under high tension. The short fibers reinforce the belt against a lengthwise tensile force. However, they do not significantly impair expandability. This is particularly true when the fibers are not entangled but are dispersed independently and fully embedded in, and surrounded by, the elastomer.

A further advantage of the inventive structure is that with the fibers not entangled and oriented as described above, i.e. biaxially, a relatively small amount of the fibers can be employed to provide the desired durability while maintaining the expandability of the belt.

Also, the inventive belt can be made to rotate smoothly without drifting laterally along, or separating from, supporting shafts/pulleys.

The inventive process can be employed to produce a tear resistant layer with fibers distributed as described above, while at the same time minimizing defects, among which are those caused by bubbles in the elastomer, as is common in the prior art.

DETAILED DESCRIPTION OF THE DRAWINGS

The Inventive Conveying Belt

Figure 1:
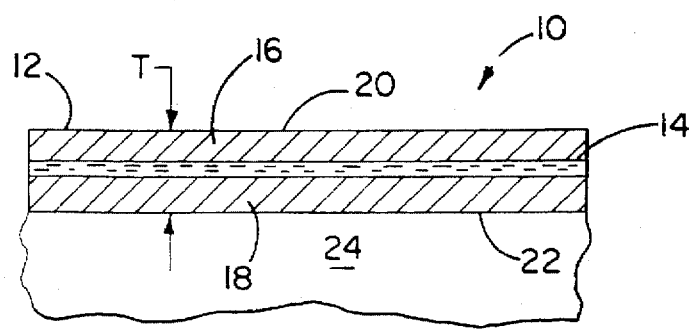
FIG. 1 is a cross-sectional view of a flat conveying belt, according to the present invention upon a pulley/shaft.
Figure 2:
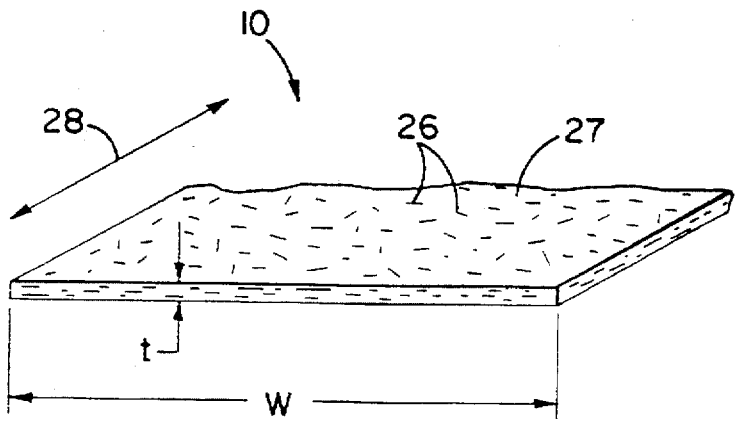
FIG. 2 is a fragmentary, perspective view of a tear resistant layer on the inventive belt of FIG. 1.

In FIGS. 1 and 2, one form of conveying belt, according to the present invention, is shown at 10. The conveying belt 10 has a body 12 defined by a tear resistant layer 14 sandwiched between a conveying layer 16 and a driving layer 18. The layers 16, 18 are each defined solely from an elastomer, with the layer 16 having an exposed outer surface 20 to support articles to be conveyed. The layer 18 defines an inner surface 22 which engages spaced pulleys/shafts 24 (one shown) around which the conveying belt 10 is trained.

The tear resistant layer 14 has discrete fibers 26 dispersed in an elastomer matrix material 27. The fibers 26 have a length that is substantially less than the width (W) of the belt body 12. The majority of the fibers 26 are oriented randomly in two directions within one or more parallel planes, i.e. in two axial directions, or "biaxially", as opposed to being oriented in three axial directions.

For purposes of this description and the claims herein, the fibers 26 will be treated as having a nominal thickness. That is, while they in fact do have a thickness, they will be described herein as if they are without thickness so that they are capable of residing within a single plane. Further, while the conveying belt 10 has an endless, annular shape, the orientation of the fibers 26 will be described in relationship to a flattened portion of the belt, i.e. where they occupy one or more planes as opposed to being an annular arrangement.

The fibers 26 reinforce the conveying belt 10 against tensile forces in the lengthwise direction of the belt 10, as indicated by the arrow 28, thereby resisting tearing of the belt 10. Preferably, the fibers 26 are not entangled, but are dispersed independently of one another to be fully surrounded by the matrix material 27 in which they are embedded. As a result, the fibers 26 do not detrimentally diminish expandability of the belt 10.

The tear resistant layer 14 has a thickness (t) that is 10–90%, and more preferably 20–60%, of the overall thickness (T) of the belt 10 between the inner surface 22 and outer surface 20. It should be understood that the invention contemplates that additional tear resistant layers 14 could be incorporated into the belt, i.e. on the surface 22 and/or on the surface 20.

The fibers 26 are preferably present in an amount of 1–20% by weight per 100 parts by weight of the elastomer matrix material 27.

If the amount of fibers 26 is less than 1%, the reinforcing effect of the fibers 26 is unsatisfactory. If the concentration of fibers 26 exceeds 20%, it is impossible to make the belt 10 effectively by a centrifugal casting process, as described below. Additionally, the fibers 26 in this high concentration become entangled and non-uniformly dispersed. The result of this is that the expandability of the belt is undesirably compromised.

The fibers 26 may be at least one of nylon, polyester, aramid, cotton, glass, etc. They preferably have a length of 0.05–5 mm and a diameter of 10 to 30 μm. Most preferably the fibers 26 are in the form of flock.

It has been found that if the length of the fibers 26 is less than 0.05 mm, the fibers 26 fail to produce the desired result otherwise expected from their random, biaxial orientation, and do not produce any appreciable benefit in terms of protecting the belt 10 against tearing. If the length of the fibers 26 exceeds 5 mm, the fibers 26 become entangled, which has the detrimental effect described above.

Figure 3:
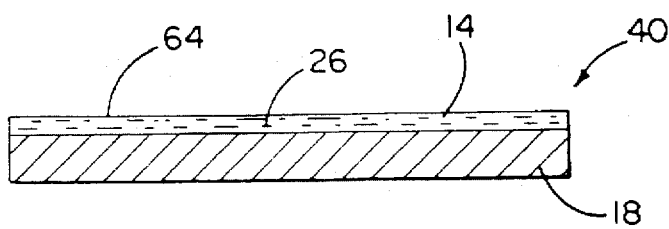
FIG. 3 is a cross-sectional view of a modified form of flat conveying belt, according to the present invention.

A modified form of conveying belt, according to the present invention, is shown at 40 in FIG. 3. The conveying belt 40 incorporates the tear resistant layer 14 and the elastomer driven layer 18 of the conveying belt 10. The tear resistant layer 14 has similar fibers 26 embedded therein in two axial directions, i.e. in a plane, dispersed independently of one another within an elastomer. The difference between the belts 10, 40 is that the belt 40 does not incorporate a layer corresponding to the elastomer conveying layer 16.

This belt 40 is highly expansible and has good tear resistance. However, it may curve along the layer 18.

Figure 4:
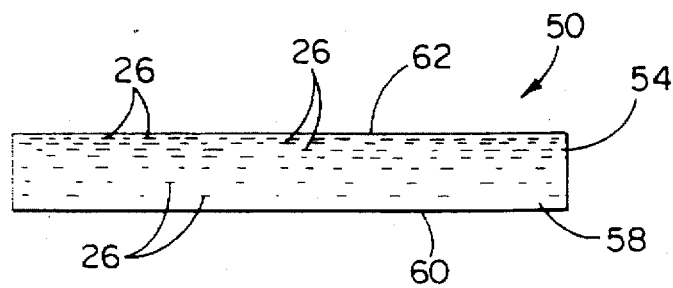
FIG. 4 is a cross-sectional view of another form of flat conveying belt, according to the present invention.

In FIG. 4, a further modified form of conveying belt, according to the present invention, is shown at 50. The conveying belt 50 has a tear resistant layer 54 containing short fibers 26 therein, with the majority of the fibers 26 oriented as in the layer 14, previously described.

However, in this embodiment, fibers 26 are dispersed also in an elastomer driving layer 58, corresponding to the driving layer 18. The fibers 26 in the layer 58 are preferably distributed in the same manner as the fibers 26 are in the layer 14. However, the fibers 26 are distributed more densely in the tear resistant layer 54 than in the elastomer layer 58. The density of the fibers 26 increases gradually from the inner surface 60 of the belt 50 to the outer surface 62 of the belt 50.

In some applications, the conveying belt 10, 40, 50 is required to have a relatively high coefficient of friction with the material that is conveyed. However, in other applications, a relatively low coefficient of friction is deskable. For example, some slippage may be deskable between articles to be conveyed and the conveying belt 10, 40, 50 to prevent damage to the articles, as they are loaded onto the belt 10, 40, 50.

The exposed surface 20 on the belt 10 has a relatively high coefficient of friction because of the absence of the fibers 26 in the elastomer conveying layer 16. On the other hand, the fibers 26 reduce the coefficient of friction for the exposed, conveying surface 64 of the belt 40 and the exposed conveying surface 62 for the belt 50.

The belt 10, with the elastomer layers 16, 18 around the tear resistant layer 14, has good resistance to curving of the belt along its width. This contributes to stability as articles are conveyed by the belt 10, as compared to the belt 40 in FIG. 3, lacking a layer corresponding to the conveying layer 16.

In certain applications, it is deskable to further reduce elongation of a conveying belt. To accomplish this, a conveying belt 70, in FIG. 5, according to the present invention, has a cord 72 with high tensile strength and low elongation, spirally embedded in an elastomer layer 74.

In the belt 70, the tear resistant layer 14, having the reinforcing fibers 26 therein, is incorporated at the outside surface 76 of the layer 74.

The elastomer used in the inventive belt 10, 40, 50, 70 is preferably a thermosetting liquid robber, or the like, exemplary of which are various hydrocarbon synthetic robbers including polyurethane, silicone and carboxyl group-ended polybutadiene rubbers. The most preferable amongst these is polyurethane.

Polyurethanes are highly elastic polymers obtained by reacting glycols, mines, hydrazides, amino-alcohols, etc.

with a prepolymer obtained by reacting an active hydrogen-ended linear polymer and a molar excess of an organic polyisocyanate and having a polyisocyanate group at its end.

The active, hydrogen-ended linear polymer is selected from among polyether polyols, polyester polyols, polylactone polyols, polyetherester polyols and polyhydrocarbon polyols having a perfectly linear, or slightly branched, molecular structure and a molecular weight of 250–5000. Polyether polyols are preferred from the standpoints of reactivity and handling.

Examples of organic polyisocyanates are 2,4-toluene diisocyanate, 2,6-toluene diisocyanate, 1,5-naphthalene diisocyanate, hexamethylene diisocyanate, 4,4'-diphenylmethane diisocyanate (pure -MDI) and polymeric MDI (crude MDI). A liquid modified product of 4,4'-diphenylmethane diisocyanate (MDI) is usually employed.

EVALUATION OF THE INVENTIVE BELT THROUGH COMPARATIVE TESTING

The Inventive Sample Belt

A flat conveying belt, made according to the present invention, was evaluated to determine certain of its properties. The inventive belt had a width of 10 mm and an inner circumferential length of 310 mm. The tear resistant layer had a thickness of 0.2 mm and contained short nylon fibers 26 having a length of 0.2 to 0.7 mm and a diameter of 25 µm. The fibers 26 were oriented randomly in two axial directions in a plane, i.e. biaxially, and dispersed to be independent of one another, and fully surrounded by the matrix material. An outer elastomer layer with a thickness of 0.3 mm and an inner elastomer layer with a thickness of 0.5 mm were used.

The belt was made according to the following process, which is tied into the inventive process, described more fully below. An outer mold having an inside diameter of 100.6 mm was installed on a centrifugal casting machine placed in a constant temperature tank at a temperature of 100° C. A urethane solution, made up of 100 parts by weight of a prepolymer, 8 parts by weight of 4,4'-diamino-3,3'-dichlorodiphenylmethane as a curing agent, 40 parts by weight of a plasticizer, and 0.5 parts by weight of a catalyst, and containing no short fibers, was poured into the outer mold. The centrifugal casting machine was rotated at a speed of 4500 rpm for five minutes, whereby a semi-crosslinked elastomer layer, having a thickness of 0.5 mm, was formed in the outer mold.

A urethane solution, containing 5% by weight of short nylon fibers, having a length of 0.2–0.7 mm and a diameter of 25 µm, in 100 parts by weight of the urethane solution as described above, was poured into the outer mold. The centrifugal casting machine was rotated at a speed of 4500 rpm for 12 minutes. The fibers 26, having a higher specific gravity than the urethane solution, were centrifugally driven outward to form a crosslinked, tear resistant layer 14 having a thickness of 0.2 mm. The majority of the fibers 26 were oriented randomly in two axial directions in a plane, and dispersed independently of one another i.e. fully surrounded by the matrix material. Simultaneously, an elastomer layer having a thickness of 0.5 mm, with a lesser amount of short fibers 26, was formed on the inside of the tear resistant layer. The tear resistant layer and the elastomer layer with the lesser amount of fibers 26 were formed together, instead of being formed separately from each other.

A crosslinked sleeve was thus formed having a wall thickness of 1.2 mm. The sleeve was ground on its outer surface to produce a wall thickness of 1.0 mm and was then cut to produce a flat conveying belt having a width of 10 mm.

Comparative Sample No. 1

A flat conveying belt was used having a urethane elastomer layer without any corresponding tear resistant layer. The total thickness of the belt was 1.0 mm, with the belt having a width of 10 mm.

Comparative Sample No. 2

The belt was a flat conveying belt having a cylindrical, knitted, polyester fabric reinforcement with a thickness of approximately 0.3 mm and placed substantially in the center of a urethane elastomer layer. The belt had a thickness of 1.0 mm and a width of 10 mm.

The three belts were tested to determine tear strength, durability against tear, variation in rotation, and lateral movement during operation through test procedures, described below. The restfits are shown in Table 1.

TABLE 1

|  | Inventive Sample | Comparative Sample No. 1 | Comparative Sample No.2 |
| --- | --- | --- | --- |
| Tear strength of belt [kgf/cm]* | 54 | 30 | 50 |
| Durability against tear as tested for a maximum of 100 hours | No change for 100 hours | Broken at the end of eight hours | No change for 100 hours |
| Variation in rotation of belt (%) | 0.21 | 0.19 | 0.56 |
| Lateral movement of belt (mm) | 0.10 | 0.13 | 0.24 |

*in accordance with JIS K6301 procedure

Tear Strength

The tear strength was determined in accordance with JIS K 6301.

Durability Against Tear

Each belt was cut at its edge. The cut had a width of 1 mm. Each cut belt was trained around spaced drive and driven shafts, with each drive shaft having a flat pulley, with a diameter of 20 mm. The system was designed so that the belts were elongated by 10%. Each belt was examined after 100 hours of travel at room temperature, with the drive pulley rotated at 2000 rpm and with no load on the driven shaft.

Variation in Rotation

The belts were attached in a system the same as that used for the durability against tear test i.e. with 10% elongation of the belts and with drive and driven shafts having flat pulleys that were 20 mm in diameter. The belts were driven at room temperature by rotating the drive pulley to a speed of 60 rpm with no load on the driven shaft. The driven shaft was examined for any variation in rotation by a rotary encoder attached to the driven shaft. The drive shaft was provided with a flywheel having a sufficiently large inertial weight to avoid any variation in rotation by the driving motor.

Lateral Movement of Belt During Operation

The same system as in the prior two tests was used. The belts were operated at room temperature, with the drive pulley rotating at a speed of 500 rpm with no load on the driven shaft. The amplitude of the lateral movement was measured by an infrared lateral movement measuring instrument.

Results

As can be seen from Table 1, the inventive conveying belt had a tear strength which was 80% higher than that of the comparative belt (sample No. 1) having no tear resistant layer, and 20% higher than that of the comparative belt (sample No. 2) having a knitted fabric insert.

The durability test of the belts under tension confirms that the inventive belt was superior to the conventional belts.

From Table 1 it can also be determined that the inventive belt was comparable to the comparative belt (sample No. 1) having no tear resistant layer, and superior to the comparative belt (sample No. 2) in the tests involving both variation of rotation and lateral movement during travel.

The Inventive Process

As discussed above, the invention is also directed to a process for manufacturing, among other things, a flat conveying belt, such as that 10, shown in FIG. 1, and including a sandwiched, tear resistant layer 14 with biaxially oriented short fibers 26. It is understood that the inventive process it is not limited to manufacturing such a belt.

The inventive process will be described with respect to FIGS. 6–9 herein. A raw material (L) for forming a conveying layer 16 on the surface of the belt 10 is prepared by adding 40 parts by weight of a plasticizer to 100 parts by weight of a liquid urethane prepolymer. This mixture (a) is stirred while maintaining it at 60° C. The mixture (a) is preheated to eliminate bubbles. A mixture (b), made up of 0.5 parts by weight of catalyst, added to eight parts by weight of a curing agent, is maintained at 110° C.

A raw material (R) for forming the tear resistant layer 54 and inner layer 58 is prepared by adding 5 parts by weight of short nylon fiber 26 and 40 parts by weight of a plasticizer, to 100 parts by weight of a liquid urethane prepolymer. The fibers 26 have a length of 0.2 to 0.7 mm and a diameter of 25 μm. The components are then mixed while being maintained at 60° C. This mixture (c) is preheated to eliminate bubbles. A mixture (d), made up of 0.5 parts by weight of catalyst, added to eight parts by weight of a curing agent, is maintained at 110° C.

To form the conveying belt, a cylindrical mold 100, as shown in FIGS. 6–9, is employed. The mold 100 has an outer part 102 having a surface 104 that faces radially inwardly with respect to the center axis 105 of the mold 100 so as to define a right circular cylinder bounding an annular space 106. An inner mold part 108 has a radially outwardly facing surface 110 in the form of a right circular cylinder, which also bounds the annular space 106. The surface 110 has a diameter of approximately 100 mm. The mold parts 102, 108 are supported by a bottom mold part 112 and supported in turn on a centrifugal molding machine 114. A top mold part 116 closes the top of the annular space 106.

Figure 6:
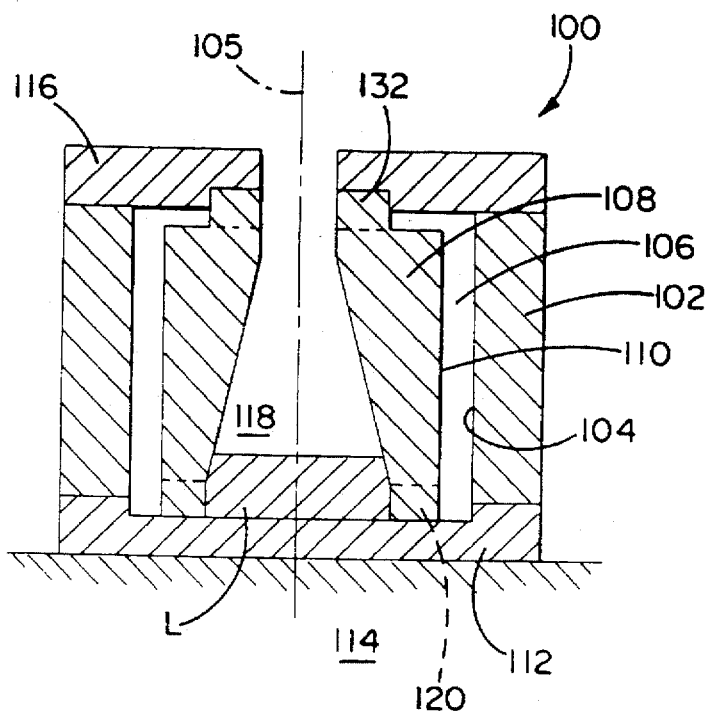
FIG. 6 is a cross-sectional view of a mold used to form a conveying belt/belt sleeve, according to the present invention, and with a material introduced to the mold.

The mold 100 is placed in a constant temperature tank, heated preferably to 100° C. The raw material (L) for the layer 16', corresponding to the conveying layer 16, and made up of a combination of the mixture (a) and the mixture (b) that is stirred for 30 seconds, is poured into a central mold chamber 118 as seen in FIG. 6. The amount of material (L) introduced is predetermined to produce the desired thickness for the layer 16'.

Figure 7:
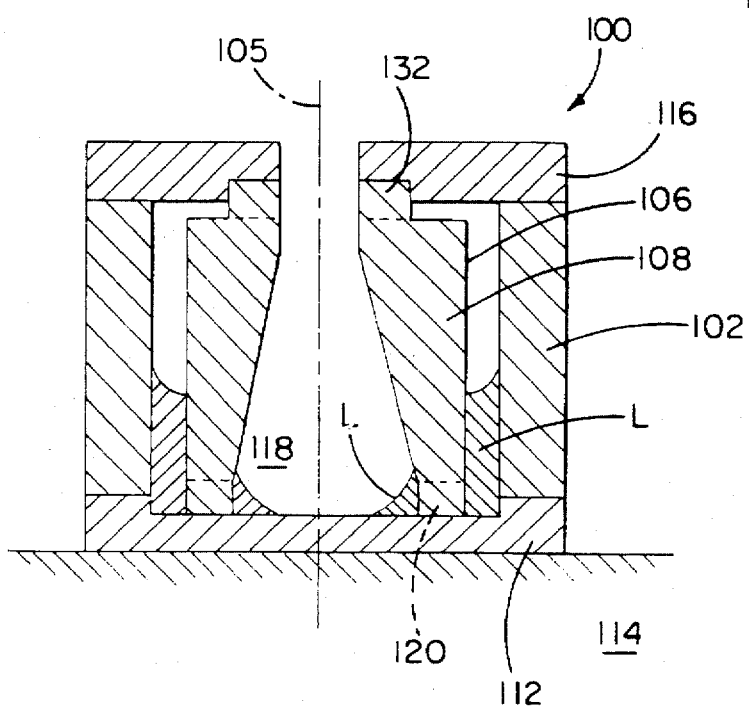
FIG. 7 is a view as in FIG. 6 with the mold being rotated to distribute the material into an annular belt forming space.
Figure 8:
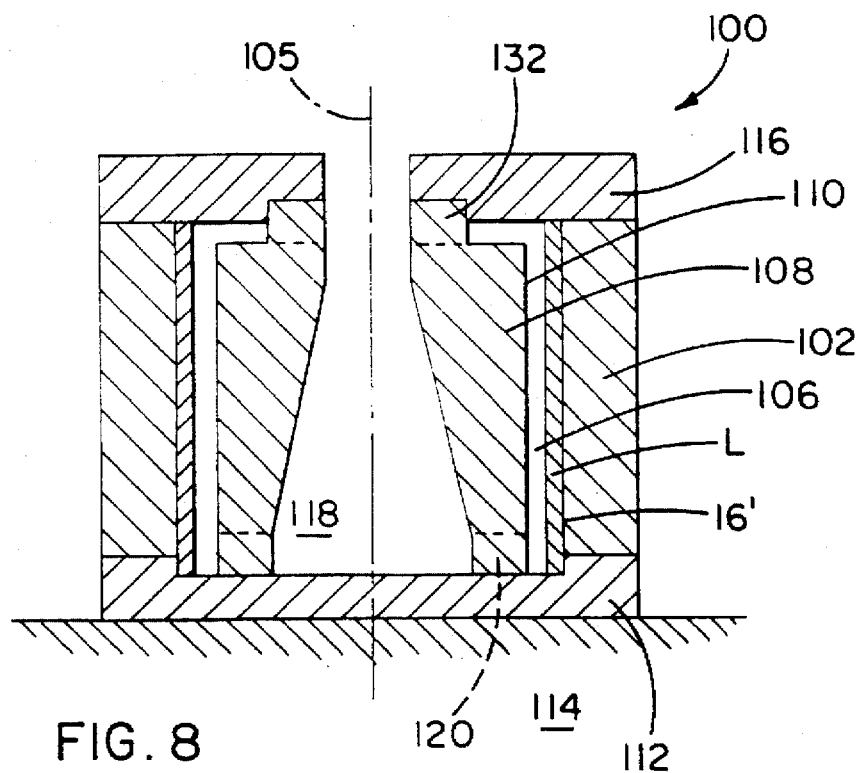
FIG. 8 is a view as in FIGS. 6 and 7 with the first material fully distributed in the annular space.
Figure 9:
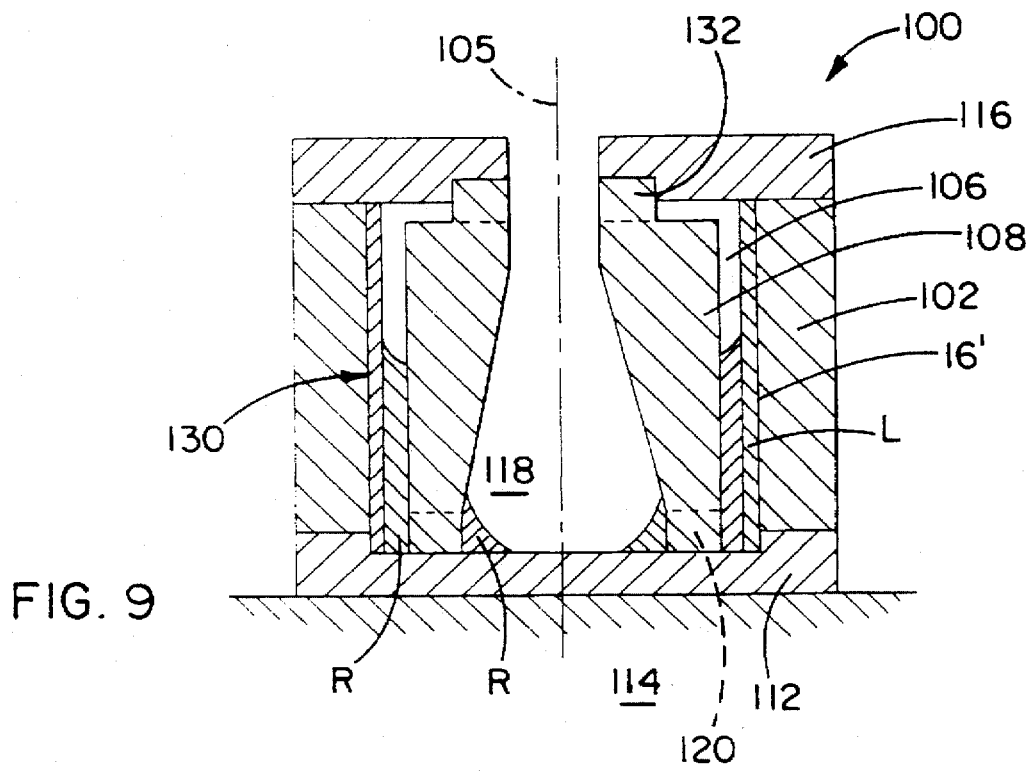
FIG. 9 is a view showing a second material being introduced into the annular space and being distributed in the annular belt forming space after distribution of the first material.

The mold 100 is rotated at a speed of approximately 4500 rpm so that the material (L) is subjected to a centrifugal force of approximately 10,000N. The material (L) is forced through a gate 120, as shown in FIG. 7, whereby the outer layer 16' is semi-crosslinked, debubbled, and cured. Once the layer 16' has been semi-crosslinked, as shown in FIG. 8, rotation of the mold 100 is ceased. Thereafter, the raw material (R), as shown in FIG. 9, for forming a tear resistant layer 14, and made up of a combination of the mixture (c) and the mixture (d) that is stirred for 30 seconds, is poured into the chamber 118. The rotational velocity of the mold 100 is progressively increased to 4500 rpm in approximately 30 seconds. As this occurs, a centrifugal force of approximately 10,000N acts upon the mold assembly. Once the 4500 rpm speed is reached, the material is allowed to undergo approximately 12 minutes of crosslinking while this speed is maintained.

The fibers 26 orient to be tangent to a cylinder centered on the mold axis 105, i.e. biaxially with the belt in a flattened state.

At the completion of the crosslinking, the mold 100 is removed from the machine 114 and in turn the belt 130 is taken out of the mold 100. The belt 130 can be trimmed. Alternatively, a belt sleeve having multiple widths can be produced by the same process, whereupon individual belts are severed from the belt sleeve.

An inventive conveying belt, having an exposed conveying surface that is defined by a tear resistant surface with biaxially oriented fibers 26, can be made by initially pouring into the mold 100 a somewhat larger amount of the material (R) than is required to form the entire belt.

If the mold 100 has a rotational velocity that is too high as the material (R) containing short fibers 26 is introduced thereto, the short fibers 26 are caused to adhere to the surface 104 on the mold part 102 in the vicinity of the gate 120 at the bottom of the mold 100. This prevents the formation of a uniform thickness for the tear resistant layer along the whole axial extent of the space 106. Thus, it is preferred that the material (R) be poured into the mold 100 with the mold 100 at a standstill or rotating at a relatively low speed. This allows the fibers 26 to remain uniformly distributed in the material (R) even after the speed of the mold 100 is increased during the process. The restfit is uniform distribution of material (R) and uniform distribution of fibers 26 in the material (R) along the axial ends of the space 106.

If the raw material (L) is poured into the mold 100, with the mold 100 at a standstill, and if the rotational velocity of the mold 100 is thereafter gradually increased, the raw material is fed evenly into the annular space to cause the fibers 26 to be distributed evenly to the top of the annular space 106.

Alternatively, the rotation of the mold assembly 100 can be increased gradually after the material (L) is poured into the mold 100 with the mold 100 already rotating at a low speed. Ideally, the speed at which the mold 100 is rotating as the raw material is poured in is selected so that the centrifugal force on the raw material (L) does not exceed 1000N. The rotational speed of the mold 100 that keeps a centrifugal force below 1000N depends on the diameter of the mold parts 102, 108, and is expressed by the equation $W = 30/\pi (F/r)^{1/2}$ where:

F=centrifugal force (N);
r=radius of the mold (m); and
W=revolutions per minute (rpm).

As an example, a speed not exceeding 1350 rpm is selected for a mold assembly having a diameter of 100 mm.

The process, described above, not only permits the manufacture of a belt having a layer of biaxially oriented short fibers, but also generally produces a belt without detrimental bubbles therein. The bubbles in the raw material are urged by centrifugal forces and eventually disappear. Bubbles in the vicinity of the surface of the inner mold part 18 are allowed to escape through an upper gate 122.

While the above description has been directed to a process for manufacturing a belt having a tear resistant layer that defines an exposed conveying surface or which is an immediate layer, it is also possible to make a belt having no definite boundary between a tear resistant layer 54 and a driving layer 58, as shown in FIG. 4. To produce this arrangement, a somewhat lower rotating speed, on the order of 430 rpm or 100N, is employed when the material is crosslinked.

Figure 5:
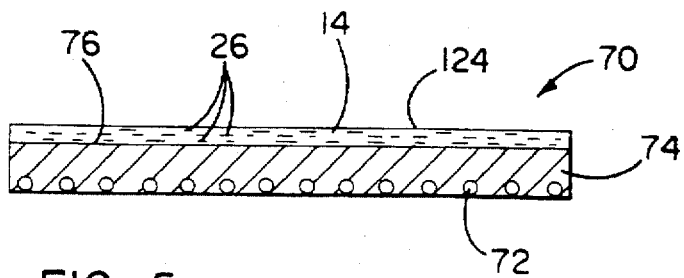
FIG. 5 is a cross-sectional view of still another form of flat conveying belt, according to the present invention.

To produce the belt 70 with the cord 72 therein, as shown in FIG. 5, it is necessary to wind the cord 72 around the mold part 108. One exemplary process incorporating the cord 72 is described below.

A mixture (e) is prepared by adding 5 parts by weight of short nylon fibers 26, having a length of 0.7 mm and a diameter of 25 μm, and 40 parts by weight of a plasticizer, to 100 parts by weight of a prepolymer. The components are stirred with the mixture maintained at a temperature of 60° C. The mixture (e) is preheated to eliminate bubbles. A mixture (f), made up of 0.5 parts by weight of a catalyst, added to eight parts by weight of a curing agent, is maintained at 110° C.

A polyester tension cord 72 is spirally wound around the surface 110 of the mold part 108, which surface 110 has a diameter of approximately 100 mm. The mold part 108 is then placed inside the mold part 102. The mold parts 102, 108 are then placed upon the bottom mold part 112 and upon the machine 114. The top mold part 116 is then put in place.

The raw material (R), made up of a combination of mixture (e) and mixture (f), stirred for 30 seconds, is poured into the chamber 118. The rotational velocity of the mold 100 is gradually increased in 30 seconds to 4500 rpm, to produce a centrifugal force of 10,000N, and thereby feed the raw material (R) into the annular space 106.

The raw material is allowed to undergo crosslinking for 15 minutes.

After crosslinking, the mold 100 is removed from the machine 114 and the mold part 108 separated to yield the belt 70 having a tear resistant layer 14, a conveying surface 124 and containing a tension cord 72.

A belt having a tear resistant layer as its intermediate layer, as well as one containing a tension cord 72, can be manufactured by first pouring into the mold 100 a pure elastomer material (L), which is semi-crosslinked to form a conveying layer as shown in FIG. 1. The process, used to form the belt 70 in FIG. 5, is then carried out so that the tear resistant layer 14 is at an intermediate location.

No appreciable difference in the density of short fibers 26 has been found from one portion of the belt/belt sleeve 130 to another using the inventive process to form a belt containing the tension cord 72. When the annular space 106 between the mold parts 102, 108 is filled with raw material, the fibers 26 in that material, by reason of having a higher specific gravity than the liquid prepolymer, are not subjected to a centrifugal force that is sufficiently large to cause their separation. Increasing the rotational velocity further causes the fibers 26 to centrifugally separate only in a radial direction to concentrate at the outer surface of the product such that density of the fibers 26 does not vary substantially between the top and bottom of the annular space 106.

The foregoing disclosure of specific embodiments is intended to be illustrative of the broad concepts comprehended by the invention.

We claim:

1. A conveying belt comprising:

a belt body having oppositely facing inner and outer surfaces and a width between laterally spaced sides, said belt body comprising a first layer, said first layer comprising an elastomer with a first plurality of discrete fibers therein each having a central axis and a length substantially less than the width of the body, a second plurality of fibers in the first plurality of fibers having lengths that are angularly oriented relative to each other, with the axes of the fibers in the second plurality of fibers residing substantially in a single plane.

2. The conveying belt according to claim 1 wherein the lengths of fibers in the first plurality of fibers are randomly angularly oriented relative to each other.

3. The conveying belt according to claim 1 wherein the fibers in the first plurality of fibers reside in a plurality of spaced, parallel planes.

4. The conveying belt according to claim 3 wherein at least one of the inner and outer body surfaces is flat and the single plane is substantially parallel to the at least one of the inner and outer body surfaces.

5. The conveying belt according to claim 1 wherein the fibers in the second plurality of fibers do not contact each other and are fully surrounded by the elastomer.

6. The conveying belt according to claim 1 wherein the body has at least a second layer that comprises an elastomer.

7. The conveying belt according to claim 1 wherein the body comprises at least a second layer, the body has a thickness between the inner and outer surfaces and the first layer has a thickness 10%–90% of the thickness of the body.

8. The conveying belt according to claim 7 wherein the first layer has a thickness from 20%–60% of the thickness of the body.

9. The conveying belt according to claim 1 wherein the fibers in the second plurality of fibers comprises at least one of nylon, polyester, aramid, cotton and glass.

10. The conveying belt according to claim 6 wherein the second layer has no fibers therein.

11. The conveying belt according to claim 1 wherein the elastomer comprises a thermosetting liquid rubber.

12. The conveying belt according to claim 1 wherein the body has a thickness between the inner and outer surfaces and the width of the body is at least eight times the thickness of the body.

13. A conveying belt comprising:

a belt body having oppositely facing inner and outer surfaces and a width between laterally spaced sides, said belt body comprising a first layer, said first layer comprising an elastomer with a first plurality of discrete fibers therein each having a central axis and a length substantially less than the width of the body, a second plurality of fibers in the first plurality of fibers with the axes of the fibers in the second plurality of fiber being angularly oriented relative to each other and residing substantially in a single plane, wherein the axes of fibers in the first plurality of fibers are randomly angularly oriented relative to each other, wherein the body comprises second and third elastomer layers with the first layer residing between the second and third layers.

14. A conveying belt comprising:

a belt body having oppositely facing inner and outer surfaces and a width between laterally spaced sides, said belt body comprising a first layer, said first layer comprising an elastomer with a first plurality of discrete fibers therein each having a central axis and a length substantially less than the width of the body, a second plurality of fibers in the first plurality of fibers with the axes of the fibers in the second plurality of fibers being angularly oriented relative to each other and residing substantially in a single plane, wherein the axes of fibers in the first plurality of fibers are randomly angularly oriented relative to each other, wherein the fibers in the first plurality of fibers are present in an amount of 1–20 parts by weight of fiber per 100 parts by weight of elastomer in the first layer.

15. A conveying belt comprising:

a belt body having oppositely facing inner and outer surfaces and a width between laterally spaced sides, said belt body comprising a first layer, said first layer comprising an elastomer with a first plurality of discrete fibers therein each having a central axis and a length substantially less than the width of the body, a second plurality of fibers in the first plurality of fibers with the axes of the fibers in the second plurality of fibers being angularly oriented relative to each other and residing substantially in a single plane, wherein the axes of fibers in the first plurality of fibers are randomly angularly oriented relative to each other, wherein the fibers in the first plurality of fibers have a length of 0.05–5 mm.

16. A conveying belt comprising:

a belt body having oppositely facing inner and outer surfaces and a width between laterally spaced sides, said belt body comprising a first layer, said first layer comprising an elastomer with a first plurality of discrete fibers therein each having a central axis and a length substantially less than the width of the body, a second plurality of fibers in the first plurality of fibers with the axes of the fibers in the second plurality of fibers being angularly oriented relative to each other and residing substantially in a single plane, wherein the lengths of fibers in the first plurality of fibers are randomly angularly oriented relative to each other, wherein the fibers in the first plurality of fibers have a diameter of 10–30 µm.

17. A conveying belt comprising:

a belt body having oppositely facing inner and outer surfaces and a width between laterally spaced sides, said belt body comprising a first layer, said first layer comprising an elastomer with a first plurality of discrete fibers therein each having a central axis and a length substantially less than the width of the body, a second plurality of fibers in the first plurality of fibers with the axes of the fibers in the second plurality of fibers being angularly oriented relative to each other and residing substantially in a single plane, wherein the fibers in the second plurality of fibers comprise flocked fibers.

18. A conveying belt comprising:

a belt body having oppositely facing inner and outer surfaces and a width between laterally spaced sides, said belt body comprising a plurality of layers including a first layer, said first layer comprising an elastomer with a plurality of discrete fibers embedded therein each having a central axis and a length substantially less than the width of the body, the axes of a majority of the discrete fibers in the first layer being randomly angularly and biaxially oriented.

19. The conveying belt according to claim 18 wherein the discrete fibers are present in an amount of 1-20 parts by weight of fiber per 100 parts by weight of elastomer in the first layer.

20. A conveying belt comprising:

a belt body having oppositely facing inner and outer surfaces and a width between laterally spaced sides, said belt body comprising a first layer, said first layer comprising an elastomer with a first plurality of discrete fibers therein each having a central axis and a length substantially less than the width of the body, a second plurality of fibers in the first plurality of fibers with the axes of the fibers in the second plurality of fibers being angularly oriented relative to each other and residing substantially in a single plane, wherein the lengths of fibers in the first plurality of fibers are randomly angularly oriented relative to each other, wherein the discrete fibers have a length of 0.05-5 mm.

21. The conveying belt according to claim 20 wherein the discrete fibers have a diameter of 10-30 μm.

* * * * *